(12) United States Patent
Yerli

(10) Patent No.: US 11,245,872 B2
(45) Date of Patent: Feb. 8, 2022

(54) MERGED REALITY SPATIAL STREAMING OF VIRTUAL SPACES

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/904,213

(22) Filed: Jun. 17, 2020

(65) Prior Publication Data
US 2020/0402315 A1    Dec. 24, 2020

Related U.S. Application Data

(60) Provisional application No. 62/863,171, filed on Jun. 18, 2019.

(51) Int. Cl.
*G06T 17/10*    (2006.01)
*H04N 7/15*    (2006.01)
(Continued)

(52) U.S. Cl.
CPC ............. *H04N 7/157* (2013.01); *G06F 9/453* (2018.02); *G06F 16/2379* (2019.01);
(Continued)

(58) Field of Classification Search
CPC .................................................. G06T 19/006
See application file for complete search history.

(56) References Cited

U.S. PATENT DOCUMENTS 5,883,817 A    3/1999    Chisholm
5,956,039 A    9/1999    Woods et al.
(Continued)

FOREIGN PATENT DOCUMENTS

CN    100484726 C    5/2009
CN    102120325 B    12/2012
(Continued)

OTHER PUBLICATIONS

European Search Report dated Jan. 17, 2020, in European Application No. 19176436.4, filed May 24, 2019, 33 pages.
(Continued)

*Primary Examiner* — Robert J Craddock
(74) *Attorney, Agent, or Firm* — Christensen O'Connor Johnson Kindness PLLC

(57) ABSTRACT

A merged reality system comprises at least one server storing a virtual world system comprising one or more virtual objects, the virtual objects including virtual replicas of at least a first location, a second location, and real world elements in the at least first and second locations. The at least one server is configured to receive, from a plurality of connected devices communicating with the at least one server through a network, real-world data from real-world elements in the first and second locations; use the real-world data from the first and second locations in the virtual world system to enrich and synchronize the virtual replicas with corresponding real-world elements; and overlap and stream at least one portion of the real-world data from the second location onto, e.g., one or more surfaces of the virtual replica of the first location.

20 Claims, 9 Drawing Sheets

(51) Int. Cl.

| | | |
|---|---|---|
| *G06T 19/00* | (2011.01) | |
| *H04L 29/06* | (2006.01) | |
| *G06T 7/70* | (2017.01) | |
| *G06F 9/451* | (2018.01) | |
| *G06F 16/23* | (2019.01) | |
| *G06N 20/00* | (2019.01) | |
| *G06F 16/9535* | (2019.01) | |
| *H04L 29/08* | (2006.01) | |
| *G06T 15/20* | (2011.01) | |
| *G06T 17/00* | (2006.01) | |
| *G06Q 20/12* | (2012.01) | |

(52) U.S. Cl.
CPC ......... *G06F 16/9535* (2019.01); *G06N 20/00* (2019.01); *G06T 7/70* (2017.01); *G06T 15/205* (2013.01); *G06T 17/005* (2013.01); *G06T 17/10* (2013.01); *G06T 19/006* (2013.01); *H04L 65/4069* (2013.01); *H04L 65/4076* (2013.01); *H04L 67/10* (2013.01); *G06Q 20/123* (2013.01); *G06T 2219/024* (2013.01)

(56) References Cited

U.S. PATENT DOCUMENTS

| | | | |
|---|---|---|---|
| 6,278,479 | B1 | 8/2001 | Wilson et al. |
| 6,556,206 | B1 | 4/2003 | Benson et al. |
| 7,168,051 | B2 | 1/2007 | Robinson et al. |
| 7,529,690 | B2 | 5/2009 | Hadi |
| 8,326,704 | B2 | 12/2012 | Glazer et al. |
| 8,564,621 | B2 * | 10/2013 | Branson .................. G09G 5/12 345/632 |
| 9,281,727 | B1 | 3/2016 | Coley et al. |
| 9,511,291 | B2 | 12/2016 | Lyons et al. |
| 9,573,062 | B1 * | 2/2017 | Long .................. A63F 13/5255 |
| 9,669,321 | B2 | 6/2017 | Reveley |
| 9,704,298 | B2 | 7/2017 | Espeset et al. |
| 9,721,386 | B1 | 8/2017 | Worley, III et al. |
| 10,565,764 | B2 | 2/2020 | Han et al. |
| 2002/0116235 | A1 | 8/2002 | Grimm et al. |
| 2002/0191017 | A1 | 12/2002 | Sinclair et al. |
| 2003/0030658 | A1 | 2/2003 | Gibbs et al. |
| 2006/0122917 | A1 | 6/2006 | Lokuge et al. |
| 2006/0184886 | A1 | 8/2006 | Chung et al. |
| 2007/0168463 | A1 | 7/2007 | Rothschild |
| 2008/0263460 | A1 | 10/2008 | Altberg et al. |
| 2009/0055019 | A1 | 2/2009 | Stiehl et al. |
| 2009/0244059 | A1 | 10/2009 | Kulkarni et al. |
| 2009/0326713 | A1 | 12/2009 | Moriya |
| 2010/0131865 | A1 | 5/2010 | Ackley et al. |
| 2010/0131947 | A1 | 5/2010 | Ackley et al. |
| 2011/0060425 | A1 | 3/2011 | Freed |
| 2012/0038667 | A1 | 2/2012 | Branson et al. |
| 2012/0133638 | A1 | 3/2012 | Davison et al. |
| 2012/0105475 | A1 | 5/2012 | Tseng |
| 2012/0149349 | A1 | 6/2012 | Quade |
| 2013/0009994 | A1 | 1/2013 | Hill |
| 2013/0044106 | A1 | 2/2013 | Shuster et al. |
| 2013/0179576 | A1 | 4/2013 | Boldyrev et al. |
| 2013/0117377 | A1 | 5/2013 | Miller |
| 2014/0063061 | A1 * | 3/2014 | Reitan .................. G09G 3/003 345/633 |
| 2014/0214504 | A1 | 7/2014 | Young et al. |
| 2014/0221090 | A1 | 8/2014 | Mutschler et al. |
| 2014/0282220 | A1 | 9/2014 | Wantland et al. |
| 2015/0188984 | A1 | 7/2015 | Mullins |
| 2016/0300392 | A1 | 10/2016 | Jonczyk et al. |
| 2016/0343168 | A1 | 11/2016 | Mullins et al. |
| 2016/0379415 | A1 | 12/2016 | Espeset et al. |
| 2017/0092223 | A1 | 3/2017 | Fain et al. |
| 2017/0203438 | A1 | 7/2017 | Guerin et al. |
| 2017/0243403 | A1 | 8/2017 | Daniels et al. |
| 2017/0250930 | A1 | 8/2017 | Ben-Itzhak |
| 2017/0286572 | A1 | 10/2017 | Hershey et al. |
| 2017/0287496 | A1 | 10/2017 | Heitkamp et al. |
| 2017/0289202 | A1 | 10/2017 | Krasadakis |
| 2017/0358024 | A1 | 12/2017 | Mattingly et al. |
| 2018/0040038 | A1 | 2/2018 | Vanslette et al. |
| 2018/0047093 | A1 | 2/2018 | High et al. |
| 2018/0060948 | A1 | 3/2018 | Mattingly et al. |
| 2018/0089903 | A1 | 3/2018 | Pang |
| 2018/0173309 | A1 | 6/2018 | Uchiyama et al. |
| 2018/0210436 | A1 | 7/2018 | Burd et al. |
| 2018/0231973 | A1 | 8/2018 | Mattingly et al. |
| 2018/0281193 | A1 | 10/2018 | Favis |
| 2018/0342106 | A1 | 11/2018 | Rosado |
| 2018/0349108 | A1 | 12/2018 | Brebner |
| 2019/0065028 | A1 | 2/2019 | Chashchin-Semenov et al. |
| 2019/0102494 | A1 | 4/2019 | Mars |
| 2019/0102709 | A1 | 4/2019 | Correa |
| 2019/0221036 | A1 | 7/2019 | Griffin et al. |
| 2019/0361589 | A1 | 11/2019 | Yerli |
| 2019/0361797 | A1 | 11/2019 | Yerli |
| 2020/0098189 | A1 | 3/2020 | Pavloff et al. |
| 2020/0175759 | A1 | 6/2020 | Russell et al. |
| 2020/0209949 | A1 | 7/2020 | Noris et al. |
| 2020/0210137 | A1 | 7/2020 | Noris et al. |
| 2020/0211251 | A1 | 7/2020 | Noris et al. |
| 2020/0349735 | A1 | 11/2020 | Dine et al. |

FOREIGN PATENT DOCUMENTS

| | | |
|---|---|---|
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 1020180020725 A | 4/2019 |
| WO | 02/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

Massachusetts Institute of Technology, "Huggable", Jul. 17, 2013, <http://www.youtube.com/watch?v=Z-8_RhkdvoA> [retrieved Sep. 6, 2019], 2 pages.

Partial European Search Report dated Sep. 9, 2019, in European Application No. 19176436.4, filed May 24, 2019, 18 pages.

Alsamhi, S.H., et al, "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1-10.

Office Action dated Aug. 26, 2020, issued in U.S. Appl. No. 16/903,235, filed Jun. 16, 2020, 21 pages.

Office Action dated Aug. 24, 2020, issued in U.S. Appl. No. 16/903,239, filed Jun. 16, 2020, 19 pages.

Extended European Search Report dated Sep. 14, 2020, issued in European Application No. 20176245.7, 8 pages.

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

European Search Report dated Nov. 18, 2020, issued in European Application No. 20180856.5, 12 pages.

European Search Report dated Nov. 17, 2020, issued in European Application No. 20180736.9, 13 pages.

European Search Report dated Oct. 27, 2020, issued in European Application No. 20180712.0, 11 pages.

Extended European Search Report dated Nov. 16, 2020, issued in European Application No. 20180885.4, 12 pages.

(56) References Cited

OTHER PUBLICATIONS

Extended European Search Report dated Nov. 18, 2020, issued in European Application No. 20180739.3, 12 pages.
Extended European Search Report dated Nov. 18, 2020, issued in European Application No. 20180723.7, 12 pages.
Yoshiyuki Hashimoto, "iOS iBeacon/GeoFence/Navi/CoreMotion/M7" (Japanese version) Mar. 1, 2014, ISBN 978-4-7980-4070-7, pp. 82-94.
Office Action dated Jan. 11, 2021, issued in U.S. Appl. No. 16/903,239, filed Jun. 16, 2020, 28 pages.
Office Action dated Jan. 11, 2021, issued in U.S. Appl. No. 16/903,235, filed Jun. 16, 2020, 26 pages.
Yang, X., et al., "Virtual Reality Tools for Internet-Based Robotic Teleoperation", Proceedings of the Eighth IEEE International Symposium on Distributed and Real-Time Applications, 2004, 5 pages.
Asanuma, K., et al., "User Interface for Remote Operation of a Moving Robot via Internet", 9 pages.
Extended European Search Report dated Oct. 17, 2019, issued in European Application No. 19176426.5, filed May 24, 2019, 9 pages.
Korean Office Action dated May 26, 2020, issued in KR Application No. 10-2019-0060412, filed May 23, 2019, 13 pages.
Rajappa et al., "Application and Scope Analysis of Augmented Reality in Marketing using Image Processing Technique" (2016).
Office Action dated Aug. 6, 2020, in U.S. Appl. No. 16/421,155, filed May 23, 2019, 26 pages.
Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8TaqNU [retrieved on Oct. 30, 2020].
Office Action dated Feb. 12, 2021, in U.S. Appl. No. 16/421,155, filed May 23, 2019, 26 pages.
Office Action dated Nov. 19, 2020, issued in Japanese Application No. 2019096980, 42 pages.
Web+DB Press, vol. 32, May 25, 2006, ISBN 4-7741-2752-3, p. 10-17.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.
Office Action dated Nov. 17, 2020, in Japanese Application No. 2019096678, 3 pages.
Office Action dated Apr. 26, 2021, issued in U.S. Appl. No. 16/903,227, filed Jun. 16, 2020, 40 pages.
Klas et al., "VR is on the Edge: How to Deliver 360° Videos in Mobile Networks," VR/AR Network '17, ACM, Aug. 2017, pp. 30-35.
Foley et al., "KD-Tree Acceleration Structures for a GPU Raytracer," Graphics Hardware 2005, ACM, Jul. 2005, pp. 15-22.
DiVerdi et al., "Level of Detail Interfaces," Proc. Third IEEE and ACM Int'l Conf. on Mixed and Augmented Reality (ISMAR 2004), 2 pages.
Office Action dated Dec. 27, 2021, issued in U.S. Appl. No. 16/902,074, filed Jun. 15, 2020, 32 pages.

\* cited by examiner

MERGED REALITY SPATIAL STREAMING OF VIRTUAL SPACES

CROSS-REFERENCE TO RELATED APPLICATIONS

This application claims the benefit of Provisional Application No. 62/863,171, filed Jun. 18, 2019, the entire disclosure of which is hereby incorporated by reference herein for all purposes.

FIELD

The present disclosure generally relates to computer systems, and more specifically to a system and method for generating and deploying virtual replicas of real-world elements into a context-rich virtual world system.

BACKGROUND

A virtual world is a simulated environment providing a graphical and physical representation of either a real or imaginary world, where users can interact with each other or with other elements via avatars, or virtual replicas of each other. Virtual worlds are used, for example, to create video games, animation films or to train pilots in a flight simulator. In all these applications, programs are used to simulate virtual objects that interact, move, and change based on user-inputs or learned behaviors.

Objects in the virtual world may follow rules related to gravity, topography, physics and kinematics, which may or may not be based on real-world elements. As such, current techniques exist for creating a virtual replica of a real-world item. However, these virtual replicas often do not contain all or most of the data of the real-world element and the context around them, limiting the realism of the visual effects and types of interactions that the virtual replicas can have with users. Moreover, the replicas are typically not synchronized with their real-world counterpart to reflect changes made in the real-world. This limits the ability to employ the virtual world for interactive applications.

Virtual replicas that can accurately mirror the real-world elements that they represent in a less computationally-intensive way, comprising a high level of synchronized information from each element, and a high level of flexibility in how the replicas can be presented to users in different spaces, are desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A spatial streaming merged reality system of the current disclosure comprises at least one server comprising at least one processor and memory storing a virtual world system comprising one or more virtual objects, the virtual objects including virtual replicas of at least one of a first location, a second location, and real world elements in the at least one of the first and second locations. The at least one server is configured to receive, from a plurality of connected devices communicating with the at least one server through a network, real-world data from real-world elements in the at least one of the first and second locations; use the real-world data from the first and second locations in the virtual world system to enrich and synchronize the virtual replicas with corresponding real-world elements; and overlap and stream at least one portion of the real-world data from the second location onto the first location. In doing so, the real-world data from the second location is used to form part of a user's experience of the virtual replica of the first location. Said overlapping of the at least one portion of the real-world data from the second location onto the first location may be viewed by a user in any of augmented or virtual reality through a user device. The user devices may be one or more of a mobile device, personal computer, game console, media center, smart contact lenses, augmented reality glasses and head-mounted display, amongst others. In some embodiments, the at least one server is configured to overlap and stream at least one portion of the virtual replica of the second location onto at least one surface of the virtual replica of the first location. For example, a portion of the virtual replica of the second location may be projected onto a wall, building, floor, playing field, projection screen, or other surface of the virtual replica of the first location, or onto multiple surfaces such as multiple interior walls.

In some embodiments, the at least one server is configured to overlap and stream all of the real-world data from the second location onto the virtual replica of the first location. In these embodiments, the at least one portion of the real-world data from the second location comprises all of the real-world data of the second location. Thus, real-world data from the second location may be fully overlaid on top of the virtual replica of the first location, which may be adequate, for example, for virtual reality experiences. For instance, the virtual replica of the city of the user in one location may be fully covered by the virtual replica of the city in another location.

In another embodiment, the at least one server is configured to overlap and stream all of the real-world data from the second location onto the field of view of the user device in the first location without comprising the virtual replica of the first location. For instance, the view of the user in one location may be fully covered by the virtual replica of another city.

In one illustrative example of embodiments where all of the real-world data from the second location is used, the user may view, through a corresponding user device, all of the elements of the remote city in his or her own city and may have the experience of having been virtually teleported to the other city. For example, the user may walk in a virtual reality experience in his or her own room, or backyard while experiencing Paris including one or more streets, landmarks, stores, and people that are at that point in time located in Paris. In some embodiments, the virtual objects further comprise purely virtual objects and interactive applications available at one or more application libraries stored in the memory of the server, or available from external sources, or combinations thereof.

In some embodiments, the plurality of connected devices include one or more RGBD cameras, depth cameras, LIDAR cameras, CCTV cameras, or Internet of Things devices, or combinations thereof. The connected devices are configured to record events in the first and second locations, scan and generate 3D images of the first and second locations, detect state changes in one or more real-world objects within the first and second locations, or combinations thereof.

In some embodiments, the virtual objects comprise logic, virtual data and models that are input through a plurality of software platforms, software engines, or combinations thereof. The plurality of external platforms may include, for example, one or more Internet of Things (IoT) platform, machine learning (ML) platform, big data platforms, and simulation platforms, which may connect to the virtual world system through application programming interfaces (APIs) and software development kits (SDKs), in order to provide and manipulate models and consume or publish data to the virtual replicas. The engine services included in the virtual world system may include an artificial intelligence engine, a simulation engine, a 3D engine, and a haptic engine, amongst others.

In some embodiments, the real-world data comprises world spatial data and the virtual data comprises virtual spatial data. Combinations thereof by the at least one server enable augmenting the real spatial data with the virtual spatial data. In further embodiments, overlapping the at least one portion of the real-world data from the second location onto the virtual replica of the first location comprises spatial data mixing. The spatial data mixing may include classifying a first portion of virtual spatial data as onsite spatial data and a second portion of virtual spatial data as remote spatial data and mixing the first portion and second portion. In an illustrative scenario, in order to overlap the at least one portion of the virtual replica of the second location onto at least one surface of the virtual replica representing the first location comprises performing a classification of the virtual spatial data associated to the world spatial data as either onsite spatial data or remote spatial data and, based on the user's preferences and desired viewing mode, mixing part of the onsite spatial data and the remote spatial data.

In some embodiments, the cloud servers may store in the memory of at least one server separate layers for augmented reality and virtual reality. The separate layers may enable accessing, through the merged reality, the virtual replica reality in any of augmented or virtual reality, and may be activated through user devices connected to the at least one server whenever accessing one or the other type of reality. The merged reality provides users with an extended reality where real elements are overlapped or augmented by persistent virtual objects, anchored in specific geo-locations or to real elements, and comprising AI and simulations connected to the virtual replicas of the reality. Users can interact without limitations in augmented or virtual reality with this merged reality through their virtual avatar or virtual hologram. A virtual avatar may be a virtual character created to represent the user, and may comprise a physical appearance similar or different than that of the user. A virtual hologram, on the other hand, may be a virtual projection of the user being captured by one or more cameras, processed, and streamed, providing a faithful virtual representation of the user.

In some embodiments, the system further includes a user device configured to publish, through the virtual world system, the virtual replica of the second location on the first location, making the virtual replica of the second location visible to one or more users in the first location. The user device may be further configured to send an invitation to one or more other user devices located in the first location to remotely view the second location, wherein accepting the invitation triggers the at least one server to stream and overlap the virtual replica of the second location onto the virtual replica of the first location. In an illustrative scenario, overlapping and streaming of the real-world data from the second location onto the at least one surface of the virtual replica representing the first location requires a second user device located in the first location configured to publish, through the virtual world system, the virtual replica replicating the second location on the first location, making the virtual replica of the second location visible to one or more users in the first location. The second user device is further configured to invite one or more user devices located in the first location to remotely view the second location, wherein accepting the invitation triggers the server to stream and overlap the virtual replica of the second location onto the at least one surface of the virtual replica of the first location.

In some embodiments, the virtual objects further comprise one or more purely virtual objects, interactive applications, or combinations thereof, and the one or more purely virtual objects, interactive applications, or combinations thereof are published on the second location and overlapped on the first location. In alternative embodiments, the one or more purely virtual objects, interactive applications, or combinations thereof are published on the first location and overlapped on the second location, enabling interactions therewith by the first and second user devices.

In some embodiments, each physical location has an associated digital identifier stored in the at least one server, the digital identifier being configured to be retrieved by a user device from the at least one server in order to access the associated physical location through the virtual world system. The digital identifier may comprise one or more of a QR code, URL, IP address, MAC address, cryptographic hash, universally unique identifier, and organizationally unique identifier.

In some embodiments, the associated digital identifier is shared through the invitation provided to the one or more user devices located in the first location. In alternative embodiments, the associated digital identifier is openly shared as part of the first location data.

In some embodiments, the virtual replicas further comprise virtual bots and virtual avatars or virtual holograms of users, the avatars displaying a physical representation of the user or providing a graphical representation different from the user, and the virtual holograms providing a faithful virtual representation of the user as captured by one or more devices.

In some embodiments, a method enabling spatial streaming through a merged reality system is provided. The method comprises providing in memory of at least one server a virtual world system comprising virtual objects, the virtual objects comprising virtual replicas of at least one of a first location, a second location, and real world elements in the at least one of the first and second locations. The method further comprises receiving, through the virtual world system, real-world data from the real-world elements in the at least one of the first and second locations to update the virtual replicas via a plurality of connected devices communicating with the at least one server through a network. The method further comprises overlapping at least one portion of the virtual replica of the second location onto the first location, and streaming the overlapped at least one portion of the second location onto the first location.

In some embodiments, the method further comprises providing, as part of the virtual objects, purely virtual objects and interactive applications available at one or more application libraries stored in the memory of the at least one cloud server or available from external sources, or combinations thereof.

In some embodiments, the method further comprises providing, to the virtual objects, logic, virtual data and models that are input through a plurality of software platforms, software engines, or combinations thereof. The real-world data comprises world spatial data and the virtual spatial data comprises virtual spatial data. The world spatial data is digitized and integrated as part of the virtual spatial data.

In some embodiments, the overlapped portion of the second location is projected onto at least one surface of the virtual replica of the first location. In some embodiments, overlapping the at least one portion of the virtual replica of the second location onto the virtual replica of the first location comprises classifying a first portion of virtual spatial data as onsite spatial data and a second portion of virtual spatial data as remote spatial data; and mixing part of the onsite spatial data and the remote spatial data. In an illustrative scenario, overlapping the at least one portion of the virtual replica of the second location onto at least one surface of the virtual replica representing the first location comprises classifying the virtual spatial data associated to the world spatial data as either onsite spatial data or remote spatial data. Said overlapping may further comprise, based on the user's preferences and desired viewing mode, mixing part of the onsite spatial data and the remote spatial data.

In an embodiment, the method further comprises publishing, through the virtual world system, by a user device located in the first location, the virtual replica of the second location on the first location, making the virtual replica of the second location visible to one or more users in the first location; and sending an invitation to one or more other user devices located in the first location to remotely view the second location, wherein accepting the invitation triggers the server to stream and overlap the virtual replica of the second location onto the virtual replica of the first location. A computer-readable medium is also provided, which may have stored thereon instructions configured to cause a computer system, such as a merged reality system, to perform any of the methods described herein.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The system of the current disclosure may enable streaming and projecting, through a virtual world system replicating at least some areas of the real world, one area of the real world onto another one, which may be viewed in augmented or virtual reality through a user device. For example, a replicated part of one area may be projected onto a wall, building, floor, playing field, projection screen, or other surface of another area, or onto multiple surfaces such as multiple interior walls. Furthermore, a replicated part of one remote area comprising all of the data in that area may be streamed onto another area where a user may be located, with or without requiring to have the replicated area where the user is located, providing the user the sensation and experience of having been virtually teleported to the remote area.

Figure 1:
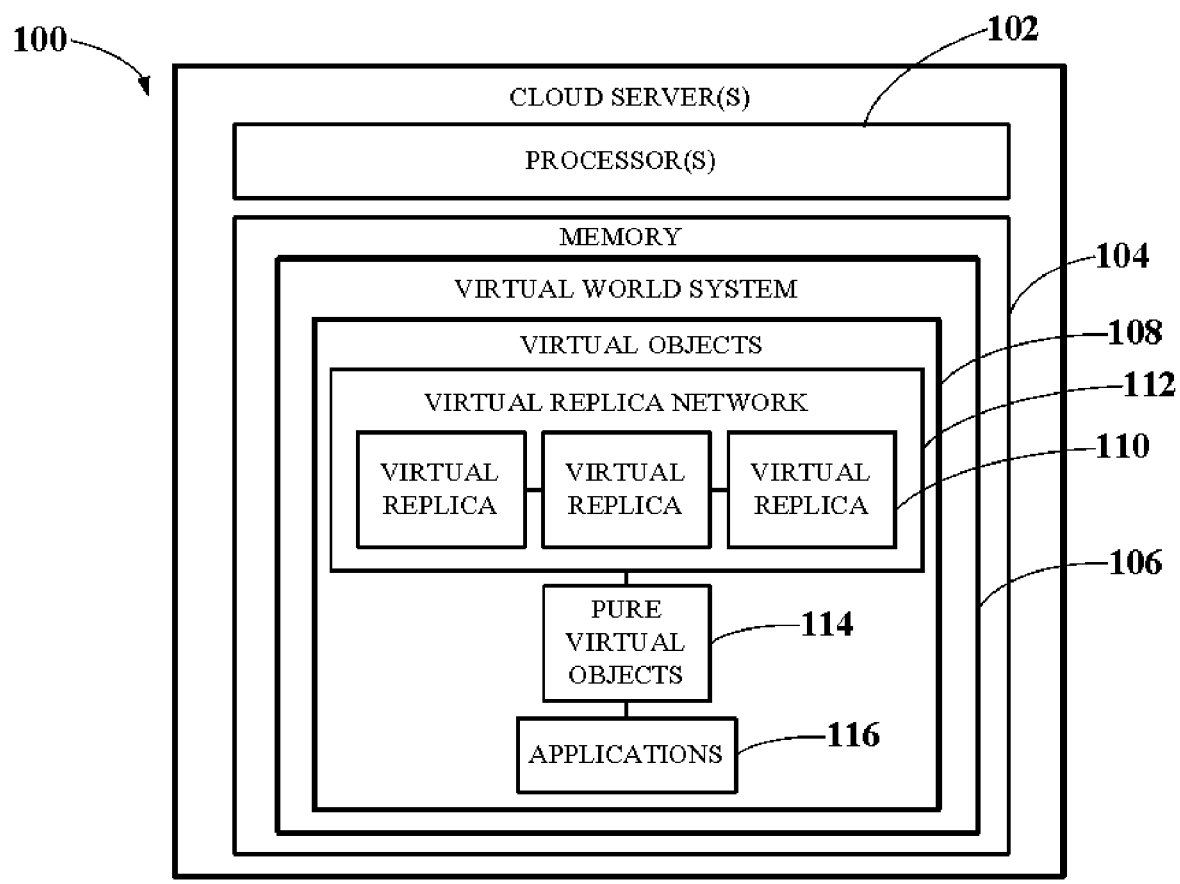
FIG. 1 depicts a diagram of a cloud server of a server computer system that may be used to implement a merged reality spatial streaming of virtual spaces, according to an embodiment.

FIG. 1 depicts a diagram of a cloud server 100 of a server computer system that may be used to implement a merged reality spatial streaming system, according to an embodiment.

The cloud server 100 comprises one or more processors 102 and memory 104 storing a virtual world system 106 replicating the real world and comprising one or more virtual objects 108 comprising virtual replicas 110 of the real-world elements. A plurality of connected virtual replicas 110 form a virtual replica network 112, which enables the establishment of peer-to-peer (P2P) connections either through direct physical communications or through indirect virtual replica-based connections. The virtual world system 106 may further store pure virtual objects 114 not available in the real world and interactive applications 116 that can be located in various parts of the world, such as in either of a first and second location that are further described in FIG. 2. In some embodiments, the virtual world system 106 may be accessed through suitable interfaces via user devices.

In some embodiments, the virtual world system 106 is a persistent virtual world system. In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in the cloud server 100). In this way, virtual replicas, purely virtual objects and applications may interact and collaborate with each other when being configured for accomplishing specific goals even if users are not connected to the server.

In the current disclosure, the term "virtual replica" refers to accurate and persistent virtual representations of real-world elements. In an embodiment, the virtual replicas 110 refer to a virtual version, also herein referred to as virtual twin, of a real-world element, also herein referred to as real twin, which may either be mapped or modeled through computer assisted drawing (CAD) or computer-assisted engineering (CAE) methods, input by computer models of the real objects (e.g., building information models—BIMs) or other suitable methods, and which may mirror not just the appearance but also the behavior of the real twin. The real-world objects may additionally include sensors that can provide the virtual replicas 110 with multi-source input data for enriching and synchronizing the virtual replicas 110 with their respective real counterpart. Thus, virtual replicas 110 may obtain data from one or more sources (e.g., from one or more real-world objects, environmental sensors, computing devices, etc.). As used herein, the term "multi-source" refers to data that may be obtained from multiple sources.

Virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on the multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices, wherein the further real-world data comprises video data, temperature data, real-time energy consumption data, real-time water consumption data, speed or acceleration data, or the like.

The virtual replica networks 112 of the merged reality spatial streaming system enables machine to machine, human to machine, machine to human, and human to human communication and interactions. The interaction mechanics are defined through the use of computer code included in computer scripts and computer programs, and may be enabled through applications, smart contracts available in a blockchain or distributed ledger-based distributed database, or combinations thereof provisioned in the virtual world system where the interactions and interaction applications take place. The applications, smart contracts or combinations thereof thus enable digitally codifying and representing the possible and desired interactions and interaction interfaces between all or most elements of the real world in a predetermined area through the virtual world system. Interactions may be experienced by users in the form of interactive game-like applications or through game-like interaction mechanics. The interactions may be enabled, for example, during virtual visitations of physical locations through a virtual replica of the physical location, whereby users visiting such a location may virtually interact with elements therein configured through the enablement of a virtual presence.

Figure 2:
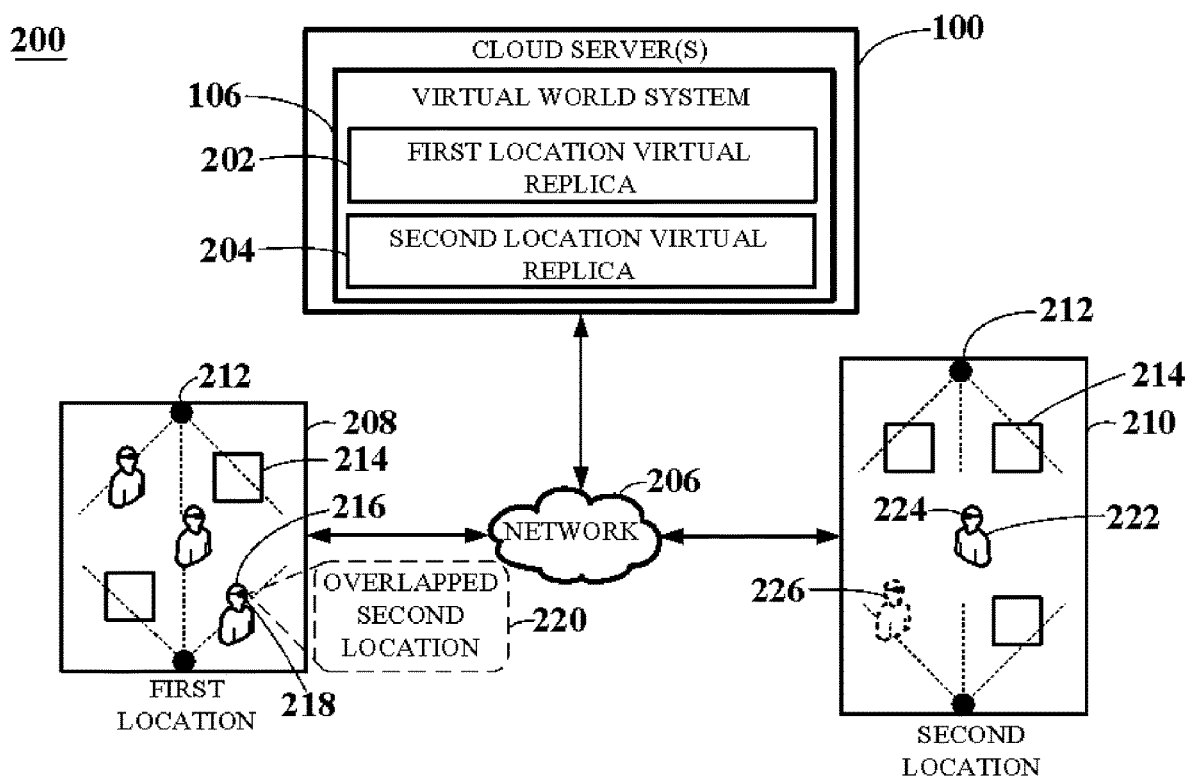
FIG. 2 shows a schematic diagram of a merged reality spatial streaming system, according to an embodiment.

FIG. 2 shows a schematic diagram of a merged reality spatial streaming system, according to an embodiment. Some elements of FIG. 2 may refer to similar or the same elements of FIG. 1 and thus may use the same reference numbers.

System 200 of FIG. 2 comprises at least one cloud server 100 configured to store and process input data, the at least one cloud server 100 comprising at least one processor and memory including a virtual world system 106 replicating locations in the real world and comprising one or more virtual replicas of real world elements. The virtual world system 106 comprises at least first and second location virtual replicas 202 and 204 connected through a network 206 to a corresponding first and second locations 208 and 210. The first and second locations 208 and 210 comprise a plurality of connected devices 212 connected through the network 206 to the virtual world system 106 and include sensing mechanisms configured to capture real-world data of real-world elements 214 in the first and second locations 208 and 210. The real-world data is then fed to the corresponding virtual replicas in the first and second location virtual replicas 202 and 204 through the virtual world system 106 in order to enrich and synchronize the virtual replicas with the corresponding real-world elements 214.

Instructions in the at least one cloud server 100, when executed by the at least one processor, may overlap and stream at least a portion of the real-world data from the second location 210 onto the first location 208, alternatively through the corresponding first and second location virtual replicas 202 and 204 in the virtual world system 106. Thus, for example, a first user 216 in the first location 208 may view through a first user device 218 in, for example, augmented reality, an overlapped version of the second location 220 projected on a surface or multiple surfaces, such as one or more walls or projection screens, in the first location 208 through the first location virtual replica 202. User devices may be one of a mobile device, personal computer, game console, media center, smart contact lenses, augmented reality glasses and head-mounted display, amongst others.

In an illustrative scenario, a trade show for the construction industry is held in a conference center. Some users are present in the conference center, and experience the trade show in augmented reality with both real and virtual product displays and demonstrations. Other users are stationed at a construction site in a remote part of the world and experience the trade show remotely, viewing a virtual replica of the conference center, which may include versions of the same product displays and demonstrations. Cameras at the construction site record content of interest to the trade show attendees, such as deployment of new construction equipment featured at the trade show. A server system streams the content from the construction site to the virtual replica of the trade show, which allows the construction site content to be seen by users that are currently experiencing the tradeshow. The server system overlaps the content from the construction site onto the replica of the conference center by, e.g., projecting the content onto a surface of a wall or projection screen in the conference center. The surface may be blank or otherwise not in use, so that the projection of the content onto the surface does not obscure other content of interest from the first location. In this way, the users' experience of the trade show is enhanced with additional content from the construction site, without interrupting the original experience of the trade show.

This may provide a similar effect to using a projector to display video on a screen or wall. However, the use of the term projection in this example does not necessarily imply the presence of a real projector, and may instead involve presenting streamed content within a virtual replica, such that the streamed content replaces a surface as it originally appears in the virtual replica. In practice, this may be achieved by storing coordinates, dimensions, orientation, etc., of a surface of the wall or screen such that when the content from the construction site is overlapped onto it, the original representation of the wall or screen is replaced in whole or in part with the content streamed from the construction site. After the content streaming has ended, the appearance of the surface may return to its original state, similar to the effect of turning off a projector.

Alternatively, streamed content from a second location may overlap the virtual replica of a first location without being projected onto any surface of the first location, such as by presenting content that appears to float in space in the virtual replica of the first location, and then disappears after the streaming ends. In this situation, the streamed content may still be considered to overlap the virtual replica of the first location in the sense that the content is presented as an additional layer that overlays the virtual replica of the first location.

In some embodiments, the at least one cloud server 100 is configured to overlap and stream all of the real-world data from the second location 210 onto the virtual replica of the first location 208. In these embodiments, the at least one portion of the real-world data from the second location 210 comprises all of the real-world data of the second location 210. Thus, real-world data from the second location 210 may be fully overlaid on top of the first location virtual replica 202, which may be adequate, for example, for virtual reality experiences. For instance, the virtual replica of the city of the user in one location may be fully covered by the virtual replica of the city in another location.

In another embodiment, the at least one cloud server 100 is configured to overlap and stream all of the real-world data from the second location 210 onto the field of view of the user device 218 in the first location 208 without comprising or utilizing the first location virtual replica 202. For instance, the view of the user 216 in the first location 208 may be fully covered by the virtual replica of another city.

In one illustrative example of embodiments where all of the real-world data from the second location is used, the user 216 in the first location 208 may view, through the corresponding user device 218, all of the elements of the remote city in his or her own city and may have the experience of having been virtually teleported to the other city. For example, the user may walk in a virtual reality experience in his or her own room, or backyard while experiencing Paris including one or more streets, landmarks, stores, and people that are at that point in time located in Paris.

In some embodiments, data of real-world elements 214 comprises real spatial data that is directly input, or captured and transmitted to the corresponding first or second location virtual replicas 202 and 204, and is converted into virtual data comprising virtual spatial data. Combinations of the real and virtual spatial data by the at least one cloud server 100 enable augmenting the real spatial data with the virtual spatial data. Thus, for example, the position and orientation of the real-world elements 214 and users within the second location 210 (e.g., a second user 222) are mapped or sensed through the plurality of connected devices 212 and are updated in real-time in the virtual world system 106 through the second location virtual replica 204, enabling the first user 216 to view in real-time any change in the second location 210.

Augmenting the real data with virtual data refers to providing further capabilities to the real world objects via the computations performed in the virtual world system 106, such as through implementation of virtual sensors and wireless power transmission. In another example, augmenting the real data with virtual data may be performed by optimizing the real world objects through the computations in the virtual world system 106. Other examples of augmenting the real world data with virtual world data may include providing users with media streams in augmented reality comprising purely virtual objects, or virtual replicas of real objects, or combinations thereof, that may animate a specific scene of the real world.

In some embodiments, the plurality of connected devices 212 in the first and second locations 208 and 210 comprise one or more RGBD cameras, depth cameras, LIDAR cameras, CCTV cameras, and Internet of Things devices. In a yet further embodiment, the connected devices 212 are configured to record events in the first and second locations 208 and 210, scan and generate 3D images, detect state changes in one or more real-world elements 214, or combinations thereof. In yet further embodiments, cameras employed within the first and second locations 208 and 210 use artificial intelligence-based machine vision to identify real-world elements 214 or people and their positions and orientations within the first and second locations 208 and 210.

In some embodiments, overlapping and streaming of the real-world data from the second location 210 onto the at least one surface of the first location 208 through the first location virtual replica 202 requires the second user 222 to publish, via a second user device 224 through the virtual world system 106, the second location virtual replica 204 on the first location 208, making the second location virtual replica 204 visible to one or more users in the first location 208 (e.g., first user 216). In some embodiments, overlapping and streaming of the real-world data may further comprise inviting one or more users in the first location 208 to remotely view the second location 212. Accepting the invitation by the first user 216 triggers the at least one cloud server 100 to stream and overlap the second location virtual replica 204 onto the at least one surface of the first location 208 through the corresponding first location virtual replica 202 in the virtual world system 106.

As described with reference to FIG. 1, the virtual objects 108 in the virtual world system 106 may further comprise one or more purely virtual objects 114 and interactive applications 116. In yet further embodiments, and with reference to FIGS. 1 and 2, the one or more purely virtual objects 114, interactive applications 116, or combinations thereof are published on the second location 210 through the corresponding second location virtual replica 204 and overlapped on the first location 208 through the corresponding first location virtual replica 202. In another embodiment, the one or more purely virtual objects 114, interactive applications 116, or combinations thereof are published on the first location through the corresponding first location virtual replica 202 and overlapped on the second location 210 through the corresponding second location virtual replica 204. Publishing of the one or more purely virtual objects 114 and interactive applications 116 may enable interactions therewith by user devices.

In some embodiments, the first and second locations 208 and 210 comprise corresponding associated digital identifiers stored in the at least one cloud server 100. The digital identifier may be retrieved by a user device 218 from the at least one cloud server 100 in order to access the associated physical location through the virtual world system 106. In some embodiments, the digital identifier comprises one or more of a QR code, URL, IP address, MAC address, cryptographic hash, universally unique identifier, and organizationally unique identifier.

In yet further embodiments, a user, such as a first user 216, may access the second location 210 through the virtual world system 106 via the first user device 218 upon receiving an invitation from a second user 222 sent through a second user device 224. The second location virtual replica 204 may be streamed and overlapped onto the at least one surface of the first location 208 through the corresponding first location virtual replica 202 through a process of spatial data mixing. By way of example, the second user 222 may be a host of an event taking place in the second location 210 that may be accessed by the first user 218 from the first location 208 acting as a guest of the event upon receiving and accepting the invitation. The host, which may be the creator of a live event taking place in the second location 210, may thus receive the guest and, in some embodiments, may additionally act as a personal assistant dedicated to provide help to the guest. In some embodiments, the host may be a human or an artificial intelligence personal assistant.

In yet further embodiments, the digital identifier is retrieved by the first user device 218 upon receiving the invitation. In other embodiments, the digital identifier is openly shared as part of contact details of the second location 210 or of the second user device 224.

In some embodiments, the first user 216 acting as a guest may be received by the second user 222 acting as a host 218 in the second location 210. Each user may view each other as a virtual avatar from their current location. For example, the second user 222 may view the first user 216 as a user avatar 226 or as a virtual hologram. The first user 216 may likewise view the second user 222 as a user avatar or as a virtual hologram that may be overlapped onto at least one surface of the first location 208. However, in this example, only the first user 216 may view a virtual projection of the second location 210 onto the at least one surface of the first location 208. In other words, from the perspective of the second user 222, the first user avatar 226 is being projected on the second location 210, and from the perspective of the first user 216, the second location 220 along with the second user 222, through a corresponding second user avatar or hologram (not shown), may be overlapped on at least one surface of the first location 208. The guest may virtually interact with the host or with any real-world elements 214 comprised within the second location 210. Furthermore, real-world elements 214 within the live event physical location 202 may also interact with each other via their respective virtual replicas within the live event physical location virtual replica 206.

For example, a user located in the second location 210 may publish, via his or her user device, the second location virtual replica 204. Publishing the second location virtual replica 204 may require a prior scanning of the second location 210 through the user device. However, if the second location space has already been included in the virtual world system 106, there may be no need to scan the second location 210 again. A user in the first location 208 may view the available published second location virtual replica 204 from the first location 208 via a user device. For example, the second location virtual replica 204 may be available from a list of published location virtual replicas that the user in the first location 208 may view and, if desired, access. Alternatively, the user in the second location 210 may also send an invitation to the user in the first location 208 to access the second location virtual replica 204. The user in the second location 210 may further publish purely virtual objects 114 and/or interactive applications 116 in the second location virtual replica 204. By way of example, the purely virtual objects 114 may comprise fictitious characters, floating items, or a complete virtual "skinning" of the room (e.g., by providing a virtual graphical layer representing another ambiance). The interactive applications 116 may be, for example, games that may enable interactions between the users. Further in this example, the second location 210 may comprise a corresponding associated digital identifier that may be either publicly shared when publishing the second location virtual replica 210 or may be sent as part of the invitation sent to the user device of the user in the first location 208. The user in the first location 208 may view the published first location and may access it, triggering the at least one cloud server to 100 to overlap the real-world data from the second location 210 onto the at least one surface of the first location 208 through the first location virtual replica. The overlapping may be performed in augmented reality or in virtual reality. The user in the first location 208 may thus have the impression of being in the second location 210 and may view a virtual avatar of the user in the second location 210, which may likewise view a virtual avatar of the user in the first location 208. Access of the published second location 210 by the user in the first location 208 may be performed in augmented or virtual reality. In the case of augmented reality, some portions of the first location 208 may still be visible while other portions of the second location 210 may be overlapped and streamed on at least one surface of the first location 208. In the case of virtual reality, all of the view of the first location 208 may be virtually covered by projecting the virtual replica of the second location 210 on the virtual replica of the first location 208. The user in the first location may thus have the sensation of being fully immersed in the second location 210 while being in the current first location 208. In one example, the user in the second location 210 may view the virtual avatar or virtual hologram of the user in the first location 208 in augmented reality. In another example, the user in the second location 210 may view the virtual avatar or virtual hologram of the user in the first location 208 streamed completely in virtual reality, wherein both the first and second users would be viewing the complete virtual replica of the second location 210.

Interactions in the first and/or second locations 210 are provisioned through computer code included in computer scripts and computer programs, and are enabled through applications comprising traditional, distributed or decentralized applications; smart contracts; and the like, or combinations thereof. The applications, smart contracts or combinations thereof thus enable digitally codifying a variety of virtual interactions, such as virtual buying, virtual investments, virtual auctions, virtually playing, virtually testing, virtually inspecting, virtually touching, virtually gazing, virtually physically speaking, virtually listening, virtually physically interacting, virtually voting, virtually signing, virtually drawing, virtually composing, virtually creating, virtually collaborating, virtual locomotion, virtually driving, virtually flying, virtually performing surgery, virtually consulting, virtually vacating, virtually constructing, virtually engineering, virtually designing, virtually training, virtually learning, virtually educating, virtually medicating, virtually remote controlling, virtually feeling, virtually emoting, virtually winking, virtually waving, virtually paying, virtually transferring, virtually sharing, and virtually collecting, amongst others.

In some embodiments, the second location virtual replica 204 is accessed by the first user 216 through the virtual world system 106 in augmented or virtual reality. In these embodiments, the at least one cloud server 100 stores separate layers for each of the augmented and virtual reality that are activated through the first user device 218 connected to the at least one cloud server 100, each layer comprising augmentations of reality and virtual replicas specific to each layer. For example, the people within the second location 210 may have specific objects activated in the augmented reality layer that may only be viewed in augmented reality. When the first user 216 visits the second location 210 by streaming and overlapping the second location onto at least one surface of the first location 208, the first user 216 may only view each of the participants and objects of the live event, with no further augmentation, but when the first user 216 activates the augmented reality layer, objects and interactions with the augmentations in the augmented reality layer may be available to the guest first user 216.

According to an embodiment, user devices (e.g., first and second user devices 218 and 222) have a personal identifier or respective user data that enables the at least one cloud server 100 to identify participants in order to provide a personalized experience. Further in this embodiment, each transaction performed by the first or second users 216/220 is recorded in the memory of the at least one cloud server 100 under the user device personal identifier. In yet further embodiments, each interaction, comprising transactions within the live event, is recorded through one or more respective smart contracts on a blockchain or distributed ledger under the user personal identifier. In yet further embodiments, interactions between virtual replicas or any other element are recorded through smart contracts on a blockchain or distributed ledger.

In some embodiments, the systems of the current disclosure may use a cloud to edge infrastructure that may implement distributed computing capabilities employing public or private cloud servers, fog servers, and other systems such as enterprise systems, mobile platforms, machinery, robots, vehicles, sensors or user devices, all of which may connect through a network 206. In some embodiments, the cloud to edge infrastructure further comprises a distributed ledger-based infrastructure facilitating the transfer and storage of data necessary to widely distribute the virtual world system 106, including virtual replicas, pure virtual objects, applications, and any event or interaction within the virtual world system 106. This way, resources including physical servers and network equipment enable a shared storage and computing that may be dynamically allocated depending on factors such as the distance of the user to the resources and the network and computational demand from the users relative to each other and to the locational positions where they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of allocation.

According to an embodiment, tracking of devices is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers.

In some embodiments, in order to reduce hardware and network demands, contribute to the reduction of network latency, and improve the general merged reality experience, the system may connect through a network 206 including millimeter-wave (mmW) or combinations of mmW and sub 6 GHz communication systems, such as through $5^{th}$ generation wireless systems communication (5G). In other embodiments, the system may connect through wireless local area networking (Wi-Fi). In other embodiments, the system may communicatively connect through 4th generation wireless systems communication (4G), may be supported by 4G communication systems, or may include other wired or wireless communication systems.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices.

Figure 3A:
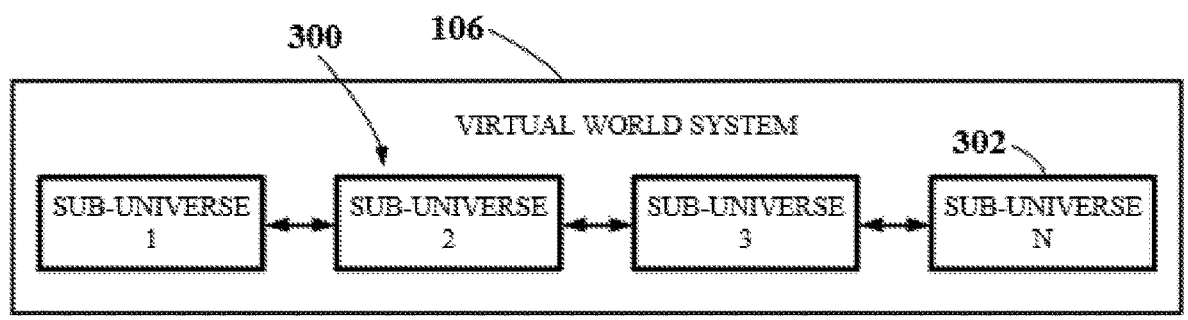
FIGS. 3A-3B show a schematic diagram of sub-universes and streams that may be employed, according to an embodiment.
Figure 3B:
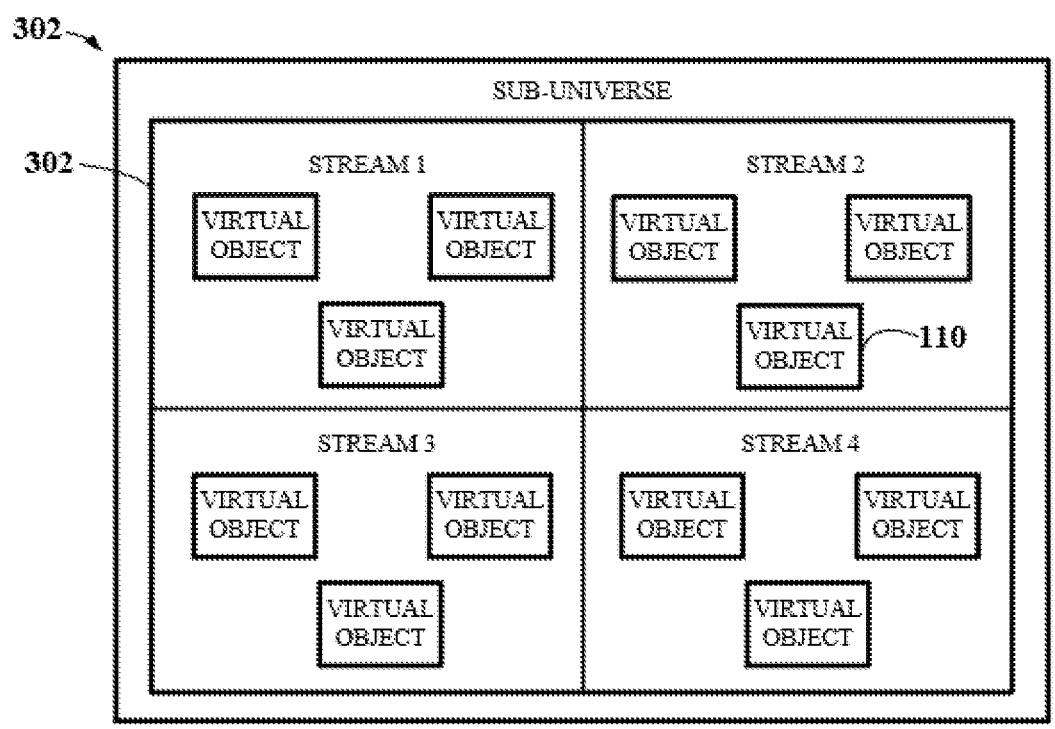

FIGS. 3A-3B show schematic diagrams of sub-universes and streams that may be employed, according to an embodiment.

With reference to FIG. 3A a sub-universe network 300, such as sub-universes 302 1-N, may form a virtual world system 106. For example, a city-verse may connect to other city-verses to form a country-verse. If the country-verse does not connect to any other sub-universes 302, then the country-verse may represent the universe of the virtual world system 106. The one or more virtualized locations used in FIG. 2 of the current disclosure, such as the first and second locations 208 and 210, may thus be a part of the same sub-universe or of a different sub-verse depending on the geographical location. Thus, each sub-universe 302 is separated and differentiated from each other geographically.

FIG. 3B shows a spatial diagram of a sub-universe 302 comprising a plurality of streams 304, such as streams 1-4, each of which comprises a plurality of stream-related virtual replicas 110. A plurality of streams 304 comprising the totality of virtual replicas 110 in a pre-determined environment forms a sub-universe 302. For example, a city-verse may represent all of the buildings, trees, people, streets, traffic lights, vehicles, etc., of a city.

Figure 4:
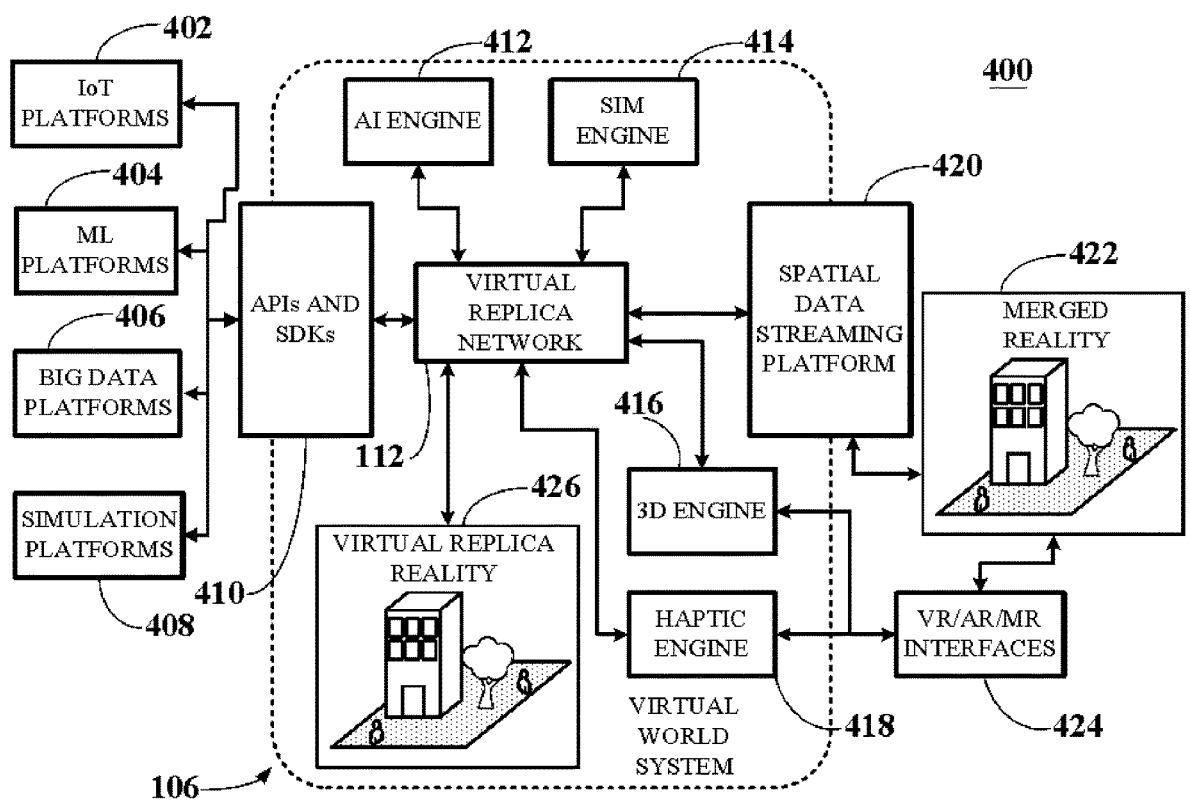
FIG. 4 depicts a schematic diagram describing platforms and interfaces used to generate virtual replica networks used in a merged reality system, according to an embodiment.

FIG. 4 depicts a schematic diagram describing platforms and interfaces used to generate virtual replica networks used in a merged reality system, according to an embodiment. With reference to FIG. 4, the elements located within the dotted lines represent the virtual world system 106 where virtual replicas and virtual replica networks 112 reside.

As viewed in FIG. 4, the virtual replica networks 112 can connect to a plurality of external platforms or to engine services included in the virtual world system 106. The plurality of external platforms may include, for example, one or more Internet of Things (IoT) platforms 402, machine learning (ML) platforms 404, big data platforms 406, and simulation platforms 408, which may connect to the virtual world system 106 through application programming interfaces (APIs) and software development kits (SDKs) 410, in order to provide and manipulate models and consume or publish data to the virtual replicas.

The IoT platforms 402 refer to software and/or hardware that enable the management of multi-source input data received from sensors in connected devices and user devices. The ML platforms 404 refer to software and/or hardware that provide the virtual replicas with the capability to use machine learning models and algorithms for artificial intelligence applications. The big data platforms 406 refer to software and/or hardware that enable organization in developing, deploying, operating and managing big data related to the virtual replica network 112. The simulation platforms 408 refer to software and/or hardware that enable using the virtual replicas and their data and models in order to virtually recreate the real behavior of the real-world entities.

The engine services included in the virtual world system 106 may include an artificial intelligence engine 412, a simulation engine 414, a 3D engine 416, and a haptic engine 418, amongst others. The artificial intelligence engine 412 refers to software and/or hardware that enables the management and application of machine learning models and algorithms for artificial intelligence applications. The simulation engine 414 refers to software and/or hardware that enable using virtual replicas and their data and models in order to virtually recreate the real behavior of the real-world entities. The 3D engine 416 refers to software and/or hardware that may be used in the creation and processing of 3D graphics of the virtual replicas. The haptic engine 418 refers to software and/or hardware that enables implementing haptic features to applications and virtual replicas to provide a touch based interaction to the users. The virtual world system also connects to a spatial data streaming platform 420 configured for the optimized exchange and management of real and virtual spatial data in the virtual world system and between the virtual world system and a merged reality 422.

The 3D engine 416 and haptic engine 418 may connect to the merged reality 422 via suitable digital reality interfaces 424 in user devices, enabling access to the merged reality 422 in any of virtual reality or augmented reality. The merged reality 422 provides users with an extended reality where real elements are overlapped or augmented by persistent virtual objects, anchored in specific geo-locations or to real elements in the reality, and comprising AI and simulations connected to the virtual replicas of the reality. Users can interact without limitations with this merged reality 422 through their virtual avatar or virtual hologram The virtual replica network 112 is an integral part of the virtual world system 106 and enables an implementation of a virtual replica reality 426, where all or most real-world elements are completely virtual and may be virtually enhanced (e.g., adding features to the virtual replicas that the real-world elements may not have). In the current disclosure, the virtual replica reality 426 differs from the typical concept of virtual reality, in that virtual reality may represent an immersive realization of the world where all or most elements are virtual, while the virtual replica reality 426 takes into account the context, accurate geolocation based on the real world objects, and interactions and connections between the virtual replicas, which are kept continuously updated through the data and models input and manipulated via the plurality of platforms and/or engines. Thus, the virtual replica reality 426 refers to the actual virtual replica of the world within the virtual world system, wherein the virtual world system provides the data, models, interactions, connections and infrastructure of each virtual replica that, in some embodiments, provide the virtual replica with self-computing capabilities and autonomous behavior.

In yet further embodiments, the system 400 may store in the memory of at least one server separate layers for augmented reality and virtual reality. The separate layers may enable accessing, through the merged reality 422, the virtual replica reality 426 in any of augmented or virtual reality, and may be activated through user devices connected the at least one server whenever accessing one or the other type of reality. Each of the layers may comprise augmentations of reality and virtual replicas that may be specific to each layer. For example, when accessing the merged reality 422 in augmented reality, a user may view the real objects located in the current merged reality scene, the current augmentations of each real object via the corresponding virtual replicas, and the purely virtual objects configured to be visible only in augmented reality. In another example, when viewing the merged reality 422 in virtual reality, the user may only view a version of the virtual replica reality 426 configured for virtual reality, comprising augmentations configured only for the virtual reality view. However, when in virtual reality, users may activate the augmented reality layer in order to view the augmentations and virtual objects originally destined for augmented reality. Likewise, when in augmented reality, users may activate the virtual reality layer in order to be fully transported to virtual reality while still being able to view the augmentations in augmented reality.

"Self-computing capabilities," also referred to as "self-managing capabilities" refers herein to the ability to apply artificial intelligence algorithms in order to autonomously manage computing resources (e.g., distributed computing resources). In an embodiment, virtual replicas with self-computing capabilities in the persistent virtual world system are able to autonomously manage computing resources to adapt to changes in the environment of corresponding real-world elements or in the real-world elements themselves. Self-managing rules and conditions may further be governed through the use of smart contracts running on blockchain or distributed ledger technologies, to further codify the rules and conditions in a distributed and transparent way. Thus, in an embodiment, each virtual replica may exhibit autonomous behavior, acting autonomously depending on the conditions in the real world reflected in the virtual world system (e.g., by allocating required resources, autonomously sending and executing commands and/or generating events as required by each circumstance. Achieving this type of behavior may require training the virtual replicas with artificial intelligence algorithms during the modeling and development of the virtual replicas. Thus, the role of a virtual replica developer may be limited to defining general policies and rules that guide the self-management process.

Figure 5:
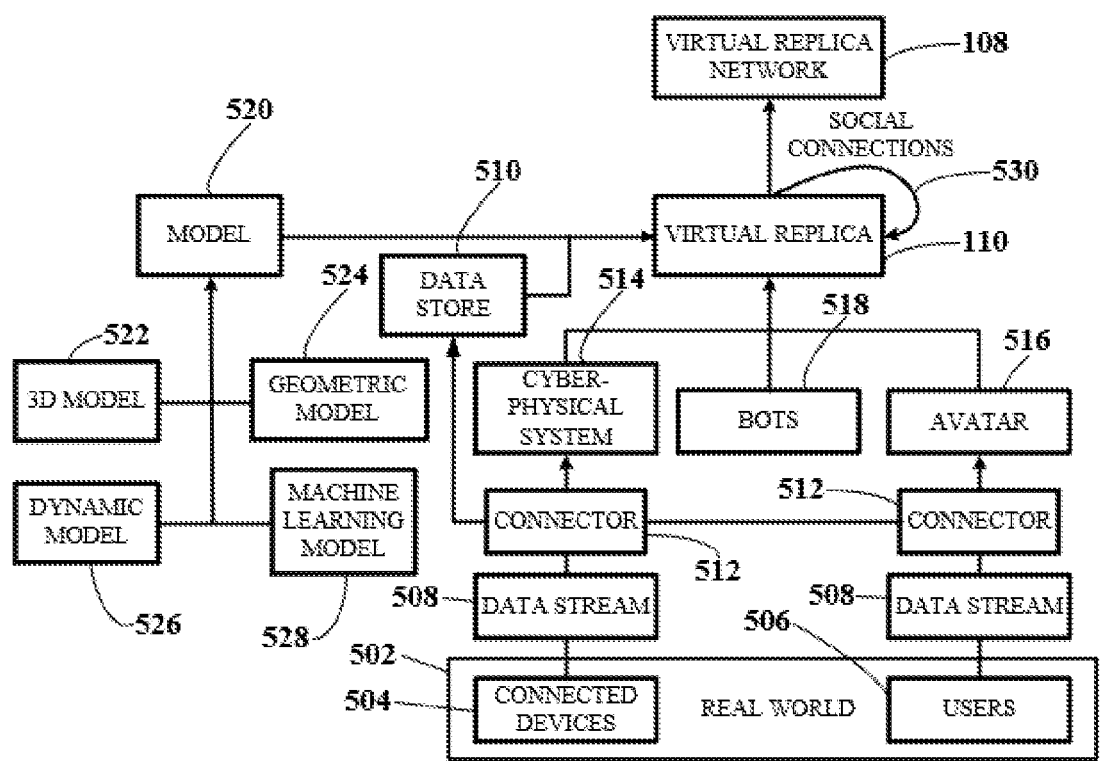
FIG. 5 depicts a schematic diagram describing models and data used by a virtual replica, according to an embodiment.

FIG. 5 depicts a diagram of a system 500 describing the design of a virtual replica and the derived virtual replica network used in a merged reality system, according to an embodiment. Some elements of FIG. 5 may refer to similar or the same elements of FIGS. 1-4 and thus may use the same reference numbers.

As viewed in FIG. 5, elements in the real world 502, comprising connected devices 504 and users 506, are connected to the virtual world system through data streams 508. These data streams 508 can be uni-directional or bi-directional depending on the capabilities of the connected devices 504. The virtual world system, as explained with reference to FIG. 1, may be stored in cloud servers 102 and shared in a cloud to edge computing and networking infrastructure. In the current disclosure, the term "users" may refer to the humans interacting with the virtual world system or to the devices that may be employed by said humans to interact with applications, such as mobile devices, personal computers, game consoles, media centers, and head-mounted displays, amongst others. In the current disclosure, connected devices 504 refer to technology-based systems that may connect and share data to a network excluding user 506 devices, such as surveillance cameras, vehicles, traffic lights, buildings, streets, train-tracks, home appliances, robots, drones and the like.

The data streams 508 sent by connected devices 504 may be obtained by sensors installed on the connected devices 504, such as one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. The data streams 508 of users 506 may comprise, apart from sensor data, user input data resulting from interactions with applications via user devices 506.

By providing a plurality of connected devices 504 and user devices 506 with sensing mechanisms constantly capturing data from the real world 502, the virtual world and each of the synchronized virtual replicas 110 are kept updated with real-time, multi-source data that mirror the conditions of the real world 502. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

Interactions in the virtual world system with the virtual replicas 110 are made through the exchange of data, using publish/subscribe services connected to the data stores 510 of each virtual replica 110. Data types may include periodic and aperiodic, synchronous and asynchronous data. Each virtual replica 110 keeps a data store 510 where the data can be updated by the real twin or by microservices (not shown). Data in the virtual world system can be associated directly to specific virtual replicas 110 or can be processed as anonymous data, which can comprise aggregation of multiple streaming sources of related virtual replicas 110.

Microservices refer to individual services that can be developed, deployed and maintained independently, each service being configured to perform discrete tasks and communicating with other services through APIs. Each microservice can update data in the data store 510 of the virtual replicas 110 using the virtual replica models and relationships with the environment to modify the value of specific attributes of the virtual replicas 110. Microservices can use specific core services of the virtual world system, such as a plurality of engines, or be connected to external platforms.

The data streams 508 may be stored in the data stores 510 via connectors 512. The connectors 512 may comprise software and hardware used to read data of the data streams 508 and write to the data stores 510. The connectors 512 may use publish/subscribe application programming interfaces (APIs) to connect to the data stores 510 and help to feed the virtual replicas 110 with the data streams 508 from connected devices 504 and user devices 506. The data streams 508 of the connected devices 504 further feed a cyber-physical system 514 through connectors 512, whereas the data streams 508 of user devices 506 feed virtual avatars 516 of the users 506 through connectors 512. System 500 also comprises implementation of bots 518, which may include hardware and software configured to respond as automated agents with human or human-like behavior by employing machine learning algorithms. The human avatars 516 may be configured to display the physical characteristics of the human users 506, or may be configured with a different visual aspect and characteristics.

In the current disclosure, a pair of virtual-real twin, or twin-pair, can be considered as a cyber-physical system 514, which is an integration of computation with physical processes whose behavior is defined by both cyber and physical parts of the system. Therefore, a virtual replica 110 is the cyber part of the cyber-physical system 514. The virtual replica 110 may then be considered as an extension of the real twin that allows connecting the physical part with artificial intelligence and simulations to improve the capabilities and performance of the object. The virtual replica 110 may, in some embodiments, be a substitute of part of the physical components and processes. For example, in cases when a sensor is failing in the real counterpart the sensing inputs for the real twin are provided by the interactions of the virtual twin in the virtual world. In another example, part of the computation for the real twin could be done in the virtual world if the battery is running low in the real twin.

The virtual replicas 110 may also comprise models 520, which refer to any graphical, mathematical or logical representation of aspects of the reality that may be used to replicate the reality in the virtual world system. In some embodiments, suitable models 520 comprise one or more of a 3D model 522, geometric model 524, dynamic model 526, and machine learning model 528. Although only four models are herein disclosed, it may be understood by those skilled in the art that the system may be adapted to implement fewer or more models than those presented.

The 3D model 522 is associated to the geometric model 524 to show data included in each of the geometries of the virtual replica 110, such as textures, colors, shading, reflection, collision effects, and the like. The 3D models 522 comprise the 3D data structure that is used to visually represent the virtual replicas 110 and other virtual elements in the virtual world system, such as applications, ads, virtual bots, etc. The 3D data structure may include, for example, one or more octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the virtual world system is employed, for example, a higher level of definition may be required for medical or scientific applications than for other types of applications; memory capacities from the servers and from the user devices and thus, desired memory consumption; and others.

The geometric model 524 comprises the mathematical model defining the shape of the virtual replica 110 based on the real-world element and may be complemented by the 3D model 522.

The dynamic model 526 represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model 528 is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual replica 110 about the behavior of a real twin in order to simulate the behavior of the real twin.

In some embodiments, the virtual world system includes a plurality of virtual objects, wherein the virtual objects include virtual data and models. The models used in the virtual replicas 110 consider the level of detail (LOD) required by a specific scenario computation. LOD involves decreasing the complexity of a model 520 representation as the virtual replica moves away from the viewer, or according to other metrics such as object importance, viewpoint-relative speed, viewer classification, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas, from low to high fidelity models, enabling different simulations to be performed depending on the case and situation LOD management increases the efficiency of computing processes, such as the rendering process by decreasing the workload on graphics pipeline usage, typically vertex transformations, or by enhancing physical simulation, as different 3D models 522 or dynamic models 526 can be associated to the virtual replicas, from low to high fidelity models, so that different simulations can be done depending on the case and situation. In general, LOD management may improve framerates and reduce memory and computing demand. LOD management allows also to provide an optimized user experience, depending on the specific requirements and context.

A plurality of connected virtual replicas 110 forms a virtual replica network 106. Each virtual replica 110 may also display social connections 350 with each other, i.e., interactions amongst each other.

In some embodiments, a virtual replica 110 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas 110 may be geolocated using a reference coordinate system suitable for use with current geolocation technologies. For example, the virtual replicas may use a World Geodetic System standard such as WGS84, which is the current reference coordinate system used by GPS.

Figure 6:
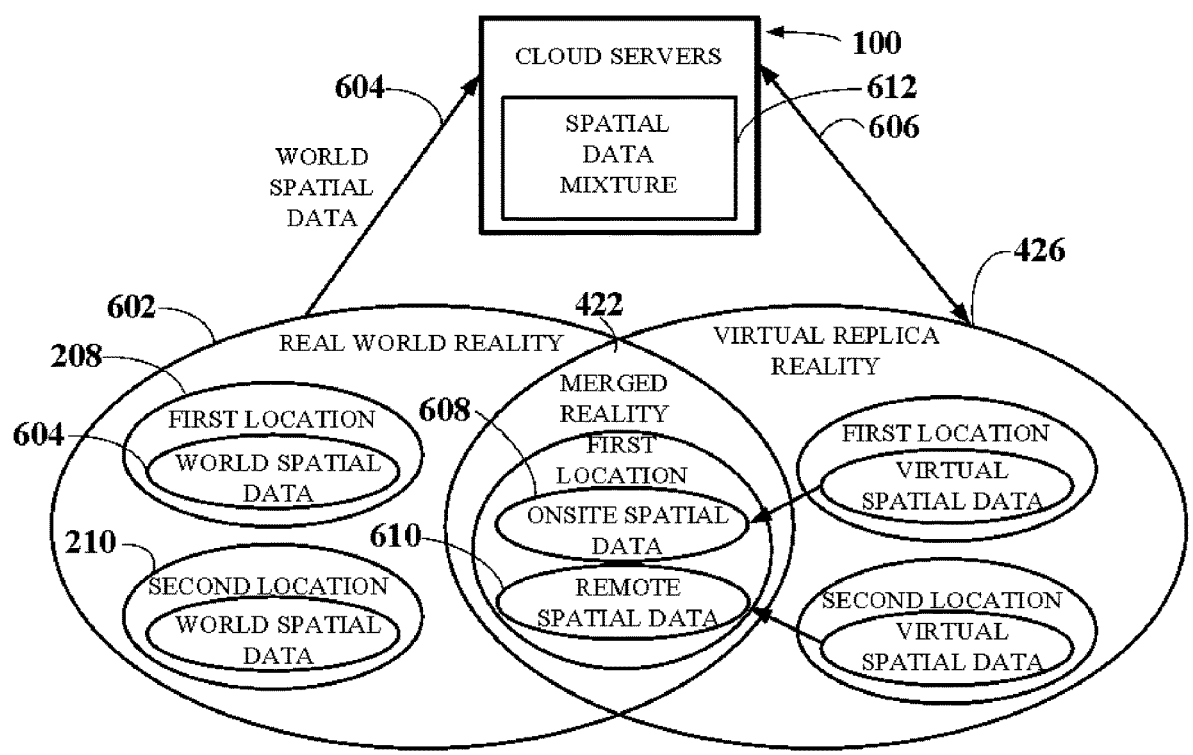
FIG. 6 depicts a schematic diagram describing a spatial data mixture that may be employed according to embodiments of the current disclosure.

FIG. 6 depicts a schematic diagram describing a spatial data mixture system 600 that may be employed according to embodiments of the current disclosure.

The multi-source data obtained from the real-world elements in the real world, or real world reality 602, comprises world spatial data 604 that is transferred to a cloud server 100 for processing. More specifically, the world spatial data 604 is obtained from a plurality of connected devices in the first and second locations 208 and 210. The world spatial data 604 is sent by the cloud servers 100 to the virtual replica reality 426 from the virtual world system, where a corresponding first and second location virtual replicas 202 and 204 are available.

The world spatial data 604 represents the ground truth data of a specific location, and is associated to instrumentation data captured physically through sensors of connected devices. The world spatial data 604 is also digitized and is thereafter part of the virtual spatial data 606. Thus, after becoming virtual spatial data 606, the virtual spatial data 606 associated to the world spatial data 604 may be classified as onsite spatial data 608 and remote spatial data 610. The onsite spatial data 608 refers to the world spatial 604 where a user is currently located, while the remote spatial data 510 refers to world spatial data 604 of a remote location where one or more other users are located. In some embodiments, the virtual spatial data 606 may further comprise data either input by users 306 manually, through existing computer models of the real-world elements (e.g., BIMs) inferred by the system from other data, such as through simulations or metadata, or spatial data of purely virtual objects or interactive applications. The spatial data may then all be mixed in a spatial data mixture process 612 that comprises combining parts of the virtual spatial data 506 depending on a user's preferences.

In the example of FIG. 6, the onsite spatial data 608 of the first location 208 is mixed in the merged reality 422 with remote spatial data 610 of the second location 210. As a result, a user in the first location 208 may, through the merged reality 422 and via a user device, view remote spatial data 610 from the second location 210 being overlapped on the onsite spatial data 608 of the first location 208. Furthermore, purely virtual objects or applications either in the first or second location virtual replicas may also be part of the virtual spatial data and may be viewed by the user in the first or the second location.

In some embodiments, obtaining the world spatial data 604 comprises obtaining a virtual map of the first and second locations 210 comprising the 3D coordinates of all or most real-world objects within the first and second locations 210 such that a 3D mesh providing a reliable version of the first and second locations 210 is obtained. Said mapping of the first and second locations 210 may be performed through executable code by one or more processors of the at least one cloud servers 100, but may also be partially performed user devices themselves in the first and second locations 210, or by any computing device within a cloud-to-edge infrastructure (e.g., cloudlets, fog servers, etc.). The virtual maps are then fed with further real-world data from the first and second locations 208 and 210, providing further models and data, as described with reference to FIGS. 4 and 5, thus creating a virtual replica of the first and second locations 208 and 210. Then, in the spatial data mixture process 612, the virtual replica of one location is overlapped on the map of the other location depending on a user's preferences and viewing mode. Viewing modes may comprise augmented reality, where at least one portion of the virtual map of one location is overlapped on another location, but wherein some elements of the user's current location is still visible; or virtual reality, wherein the remote location fully covers the original location, virtually "teleporting" the user to the remote location from the current location. In any of the viewing modes, purely virtual replicas and interactive applications may be placed and interacted with.

Figure 7:
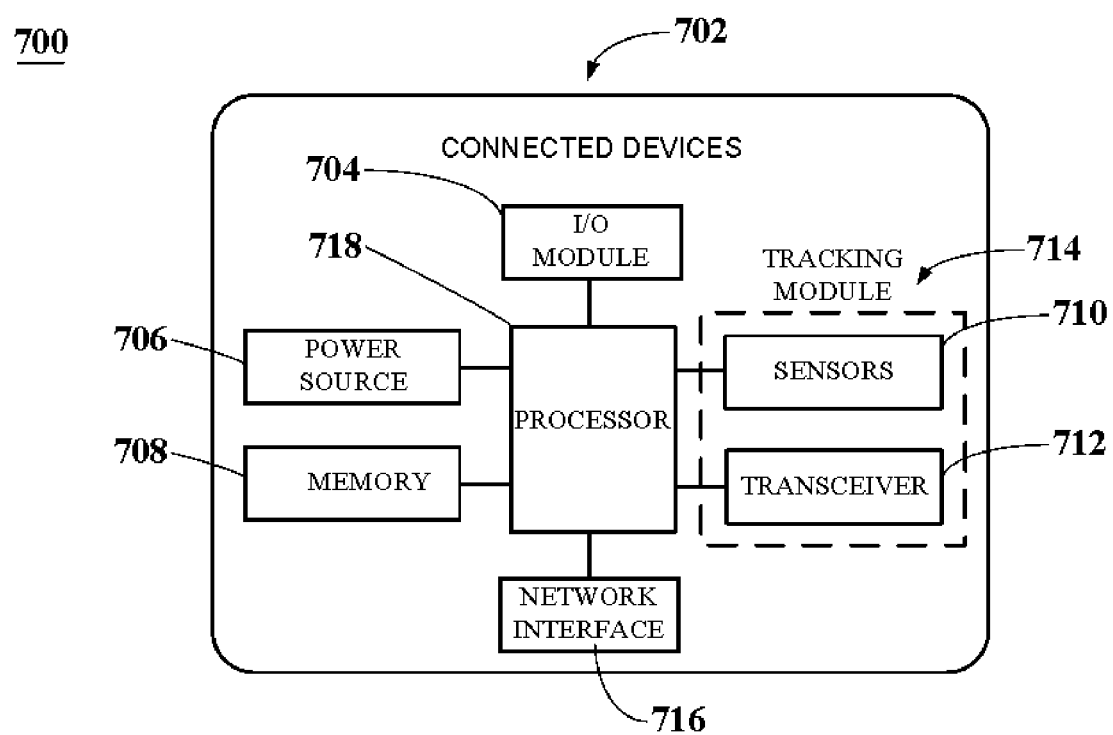
FIG. 7 depicts an operational component diagram of connected devices that may be used in a merged reality system, according to an embodiment.

FIG. 7 depicts an operational component diagram 700 of connected devices that may be used in a merged reality spatial streaming system, according to an embodiment.

A device 702 may include operational components such as an input/output (I/O) module 704; a power source 706; a memory 708; sensing mechanisms 710 and transceivers 712 forming a tracking module 714; and a network interface 716, all operatively connected to a processor 718.

The I/O module 704 is implemented as computing hardware and software configured to interact with users and provide user input data to one or more other system components. For example, I/O module 704 may be configured to interact with users, generate user input data based on the interaction, and provide the user input data to the processor 718 before being transferred to other processing systems via a network, such as to a server. In another example, I/O modules 704 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 704 may provide additional, fewer, or different functionality to that described above.

The power source 706 is implemented as computing hardware and software configured to provide power to the device 702. In one embodiment, the power source 706 may be a battery. The power source 706 may be built into the devices or removable from the devices, and may be rechargeable or non-rechargeable. In one embodiment, the devices may be repowered by replacing one power source 706 with another power source 706. In another embodiment, the power source 706 may be recharged by a cable attached to a charging source, such as a universal serial bus ("USB") FireWire, Ethernet, Thunderbolt, or headphone cable, attached to a personal computer. In yet another embodiment, the power source 706 may be recharged by inductive charging, wherein an electromagnetic field is used to transfer energy from an inductive charger to the power source 706 when the two are brought in close proximity, but need not be plugged into one another via a cable. In another embodiment, a docking station may be used to facilitate charging.

The memory 708 may be implemented as computing hardware and software adapted to store application program instructions and to store multi-source data captured by the sensing mechanisms 710. The memory 708 may be of any suitable type capable of storing information accessible by the processor 718, including a computer-readable medium, or other medium that stores data that may be read with the aid of an electronic device, such as a hard-drive, memory card, flash drive, ROM, RAM, DVD or other optical disks, as well as other write-capable and read-only memories. The memory 708 may include temporary storage in addition to persistent storage.

The sensing mechanisms 710 may be implemented as computing hardware and software adapted to obtain multi-source data from the real world and determine/track the position and orientation of the device 702 and, therefore, of the one or more real-world elements to which the device 702 may be linked. The sensing mechanisms 710 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 710 include one or more Inertia Measuring Units (IMUs), accelerometers, and gyroscopes. The IMU is configured to measure and report the velocity, acceleration, angular momentum, speed of translation, speed of rotation, and other telemetry metadata of device 702 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 712 may be implemented as computing hardware and software configured to enable devices to receive wireless radio waves from antennas and to send the data back to the antennas. In some embodiments, mmW transceivers 712 may be employed, which may be configured to receive mmW wave signals from antennas and to send the data back to antennas when interacting with immersive content. The transceiver 712 may be a two-way communication transceiver 712.

According to an embodiment, the transceivers 712 enable direct communication between computing devices via a distributed ledger-based communications pipeline connected to a network. The distributed ledger-based communications pipeline may enable direct communication between device 702 through a decentralized network by allowing storage of information in a secure and accurate manner using cryptography, employing cryptographic "keys" and cryptographic signatures. Situations that may require direct communication between device 702, and thus by-passing processing by a server, may include urgent situations in which decisions may need to be taken within a very short period of time. For example, in an autonomous driving case where two vehicles may be about to collide, it may be desired to enable a direct communication between both vehicles to generate a faster response that may prevent a collision. In other embodiments, the distributed ledger may also be utilized between a server and a device 702, where the server may take the authority to validate data before distributing it to each device 702. In further embodiments, the distributed ledger can make use of devices closer to servers, to antennas, or both, in order to assign these device 702 as central structures to validate and distribute data, such by using one or more devices in a cloud to edge infrastructure 100 depicted in FIG. 1

In an embodiment, the tracking module 714 may be implemented by combining the capabilities of the IMU, accelerometers, and gyroscopes with the positional tracking provided by the transceivers 712 and the accurate tracking, low-latency and high QOS functionalities provided by mmW-based antennas may enable sub-centimeter or sub-millimeter positional and orientational tracking, which may increase accuracy when tracking the real-time position and orientation of device 702. In alternative embodiments, the sensing mechanisms 710 and transceivers 712 may be coupled together in a single tracking module device.

The network interface 716 may be implemented as computing software and hardware to communicatively connect to a network, receive computer readable program instructions from the network sent by the server or by other devices, and forward the instructions for storage in the memory 708 for execution by the processor 718.

The processor 718 may be implemented as computing hardware and software configured to receive and process instructions. For example, the processor 718 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 718 may receive user input data from I/O module 704 and may respectively implement application programs stored in the memory 708. In other examples, the processor 718 may receive multi-source data from sensing mechanisms 710 captured from the real world, or may receive an accurate position and orientation of device 702 through the tracking module 714, and may prepare some of the data before sending the data to a server for further processing.

Figure 8:
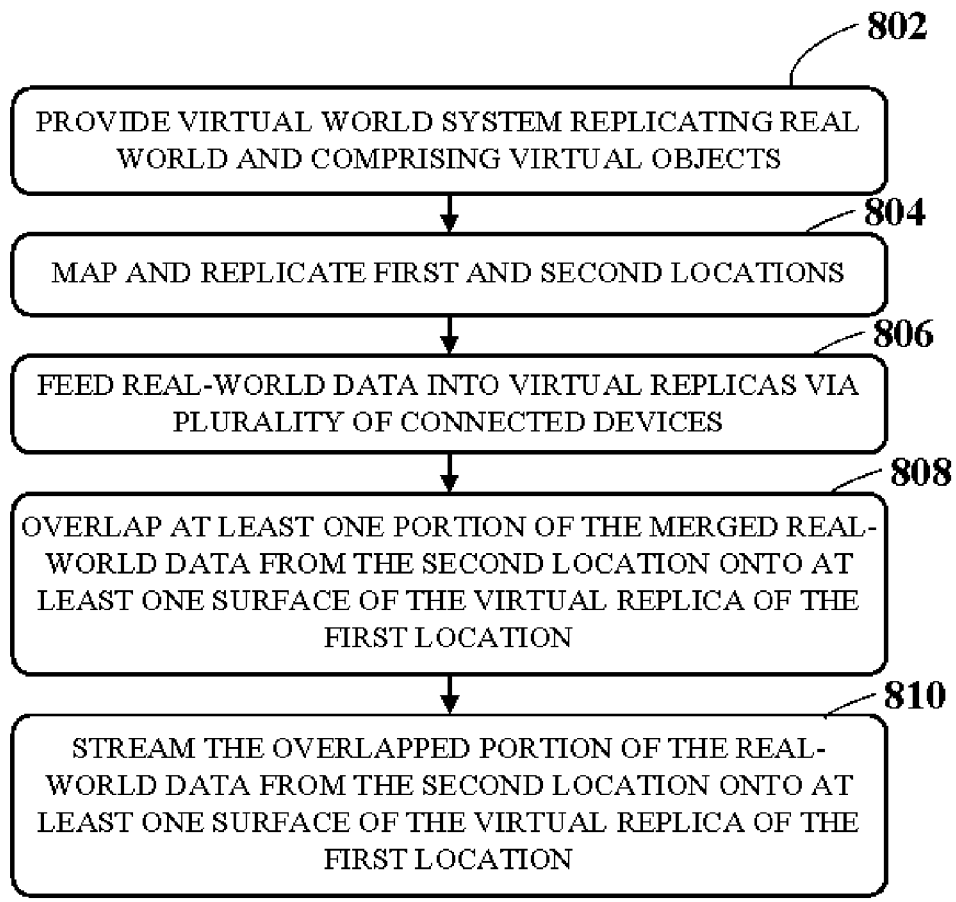
FIG. 8 depicts a method to implement a merged reality spatial streaming system, according to an embodiment.

FIG. 8 depicts a method 800 to implement a merged reality spatial streaming system, according to an embodiment. The method 800 may be implemented by a system, such as the systems depicted with reference to FIGS. 1-7.

The method 800 begins in step 802 by providing in memory of at least one server a virtual world system replicating the real world and comprising one or more virtual objects including virtual replicas of real world elements. The method 800 continues in step 804 by mapping and replicating at least one of a first and second location into the virtual world system.

Subsequently, the method 800 continues in step 806 by feeding, through the virtual world system, real-world data from the real-world elements in at least one of the first and second locations to the corresponding virtual replicas via a plurality of connected devices communicating through a network and comprising sensing mechanisms. Feeding the real-world data to the virtual replicas enables synchronizing the real data from the first and second locations with the corresponding virtual replicas in the virtual world system. Thus, for example, any event in the real world is reflected in real-time in the virtual world system, and any computation that leads to an event in the virtual world system is reflected in the real world.

In step 808, the method 800 proceeds by overlapping at least one portion of the virtual replica of the second location onto at least one surface of the virtual replica representing the first location. Finally, the method 800 may end in step 810 by streaming the overlapped at least one portion of the second location onto the at least one surface of the virtual replica representing the first location.

In some embodiments, the method 800 further comprises providing, as part of the virtual objects, purely virtual objects and interactive applications available at one or more application libraries stored in the memory of the server or available from external sources, or combinations thereof.

In some embodiments, the method 800 further comprises proving, to the virtual objects, logic, virtual data and models that are input through a plurality of software platforms, software engines, or combinations thereof, as described with reference to FIGS. 4 and 5.

In some embodiments, overlapping the at least one portion of the virtual replica of the second location onto at least one surface of the virtual replica representing the first location comprises classifying the virtual spatial data associated to the world spatial data as either onsite spatial data or remote spatial data; and based on the user's preferences and desired viewing mode, mixing part of the onsite spatial data and the remote spatial data.

In some embodiments, said overlapping and of the real-world data from the second location onto the at least one surface of the virtual replica representing the first location further comprises publishing, through the virtual world system, by a second user device located in the first location, the virtual replica replicating the second location on the first location, making the virtual replica of the second location visible to one or more users in the first location. The method may further comprise inviting one or more user devices located in the first location to remotely view the second location. Accepting the invitation triggers the server to stream and overlap the virtual replica of the second location onto the at least one surface of the virtual replica of the first location.

In some embodiments, the one or more purely virtual objects, interactive applications, or combinations thereof are published on the second location and overlapped on the first location. In other embodiments the one or more purely virtual objects, interactive applications, or combinations thereof are published on the first location and overlapped on the second location, enabling interactions therewith by the first and second user devices.

In some embodiments, the associated digital identifier is shared through the invitation provided to the one or more user devices located in the first location. In other embodiments, the associated digital identifier is openly shared as part of the first location data.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A merged reality system comprising:
at least one server comprising at least one processor and memory storing a virtual world system comprising virtual objects, the virtual objects including virtual replicas of at least one of a first location, a second location, and real world elements in the at least one of the first and second locations;
wherein the at least one server is configured to:
receive, from a plurality of connected devices communicating with the at least one server through a network, real-world data from real-world elements in at least one of the first and second locations;
use the real-world data from the at least one of the first and second locations in the virtual world system to enrich and synchronize the virtual replicas with corresponding real-world elements; and
overlap and stream at least one portion of the real-world data from the second location onto the first location, wherein the overlapped and streamed data is viewed in augmented or virtual reality through a user device.

2. The system of claim 1, wherein the at least one server is configured to overlap and stream the at least one portion of the real-world data from the second location onto at least one surface of the virtual replica of the first location, or wherein the at least one server is configured to overlap and stream all of the real-world data from the second location onto the virtual replica of the first location, or wherein the at least one server is configured to overlap and stream all of the real-world data from the second location onto the field of view of the user device in the first location without comprising the virtual replica of the first location.

3. The system of claim 1, wherein the plurality of connected devices include one or more RGBD cameras, depth cameras, LIDAR cameras, CCTV cameras, or Internet of Things devices, or combinations thereof, and wherein the connected devices are configured to record events in the first and second locations, scan and generate 3D images of the first and second locations, detect state changes in one or more real-world objects within the first and second locations, or combinations thereof.

4. The system of claim 1, wherein the virtual objects comprise logic, virtual data and models that are input through a plurality of software platforms, software engines, or combinations thereof.

5. The system of claim 4, wherein the real-world data comprises world spatial data and the virtual data comprises virtual spatial data, and wherein combinations thereof by the at least one server enable augmenting the world spatial data with the virtual spatial data.

6. The system of claim 1, wherein overlapping the at least one portion of the real-world data from the second location onto the virtual replica of the first location comprises spatial data mixing.

7. The system of claim 6, wherein the spatial data mixing comprises classifying a first portion of virtual spatial data as onsite spatial data and a second portion of virtual spatial data as remote spatial data and mixing the first portion and second portion.

8. The system of claim 1 further comprising the user device located in the first location, the user device configured to:
publish, through the virtual world system, the virtual replica of the second location on the first location, making the virtual replica of the second location visible to one or more users in the first location.

9. The system of claim 8, wherein the user device is further configured to send an invitation to one or more other user devices located in the first location to remotely view the second location, wherein accepting the invitation triggers the at least one server to stream and overlap the virtual replica of the second location onto the virtual replica of the first location.

10. The system of claim 1, wherein the virtual objects further comprise one or more purely virtual objects, interactive applications, or combinations thereof, and wherein the one or more purely virtual objects, interactive applications, or combinations thereof are published on the second location and overlapped on the first location, or published on the first location and overlapped on the second location.

11. The system of claim 1, wherein each location has an associated digital identifier stored in the at least one server, the digital identifier being configured to be retrieved by a user device from the at least one server in order to access an associated physical location through the virtual world system.

12. A method enabling presentation of a merged reality, comprising:
providing in memory of at least one server a virtual world system comprising virtual objects comprising virtual replicas of at least one of a first location, a second location, and real world elements in the at least one of the first and second locations;
receiving, through the virtual world system, real-world data from the real-world elements in the at least one of the first and second locations to update the virtual replicas via a plurality of connected devices communicating with the at least one server through a network;
overlapping at least one portion of the virtual replica of the second location onto the first location; and
streaming the overlapped at least one portion of the second location onto the first location, wherein the overlapped and streamed data is viewed in augmented or virtual reality through a user device.

13. The method of claim 12, wherein the overlapped portion of the second location is projected onto at least one surface of the virtual replica of the first location, or wherein the overlapped portion of the second location comprises all of the real-world data from the second location that is projected onto the virtual replica of the first location, or wherein the overlapped portion of the second location comprises all of the real-world data from the second location that is projected onto the field of view of the user device in the first location without comprising the virtual replica of the first location.

14. The method of claim 12, further comprising providing, to the virtual objects, logic, virtual data and models that are input through a plurality of software platforms, software engines, or combinations thereof.

15. The method of claim 14, wherein the real-world data comprises world spatial data and the virtual spatial data comprises virtual spatial data, wherein the world spatial data is digitized and integrated as part of the virtual spatial data.

16. The method of claim 12, wherein overlapping the at least one portion of the virtual replica of the second location onto the virtual replica of the first location comprises:
classifying a first portion of virtual spatial data as onsite spatial data and a second portion of virtual spatial data as remote spatial data; and
mixing part of the onsite spatial data and the remote spatial data.

17. The method of claim 12 further comprising:
publishing, through the virtual world system, by a user device located in the first location, the virtual replica of the second location on the first location, making the virtual replica of the second location visible to one or more users in the first location; and
sending an invitation to one or more other user devices located in the first location to remotely view the second location, wherein accepting the invitation triggers the server to stream and overlap the virtual replica of the second location onto the virtual replica of the first location.

18. The method of claim 12, wherein the virtual objects further comprise one or more purely virtual objects, interactive applications, or combinations thereof, and wherein the one or more purely virtual objects, interactive applications, or combinations thereof are published on the second location and overlapped on the first location, or published on the first location and overlapped on the second location.

19. A non-transitory computer-readable medium having stored thereon instructions configured to cause a merged reality system to perform steps comprising:
providing in memory of at least one server a virtual world system comprising virtual objects comprising virtual replicas of at least one of a first location, a second location, and real world elements in the at least one of the first and second locations;
receiving, through the virtual world system, real-world data from the real-world elements in at least one of the first and second locations to update the virtual replicas via a plurality of connected devices communicating with the at least one server through a network;
overlapping a portion of the virtual replica of the second location onto the virtual replica of the first location; and
streaming the overlapped portion of the second location onto the virtual replica of the first location.

20. The non-transitory computer-readable medium of claim 19, wherein the overlapped portion of the second location is projected onto at least one surface of the virtual replica of the first location, or wherein the overlapped portion of the second location comprises all of the real-world data from the second location that is projected onto the virtual replica of the first location, or wherein the overlapped portion of the second location comprises all of the real-world data from the second location that is projected onto the field of view of the user device in the first location without comprising the virtual replica of the first location.

* * * * *